Oct. 20, 1953
S. J. TUCKER
2,656,052
APPARATUS FOR FEEDING LENGTHS OF DRILL
PIPE IN SUCCESSION TO THE DRILL
PIPE ELEVATOR OF DRILL RIGS
Filed Nov. 5, 1951
4 Sheets-Sheet 4
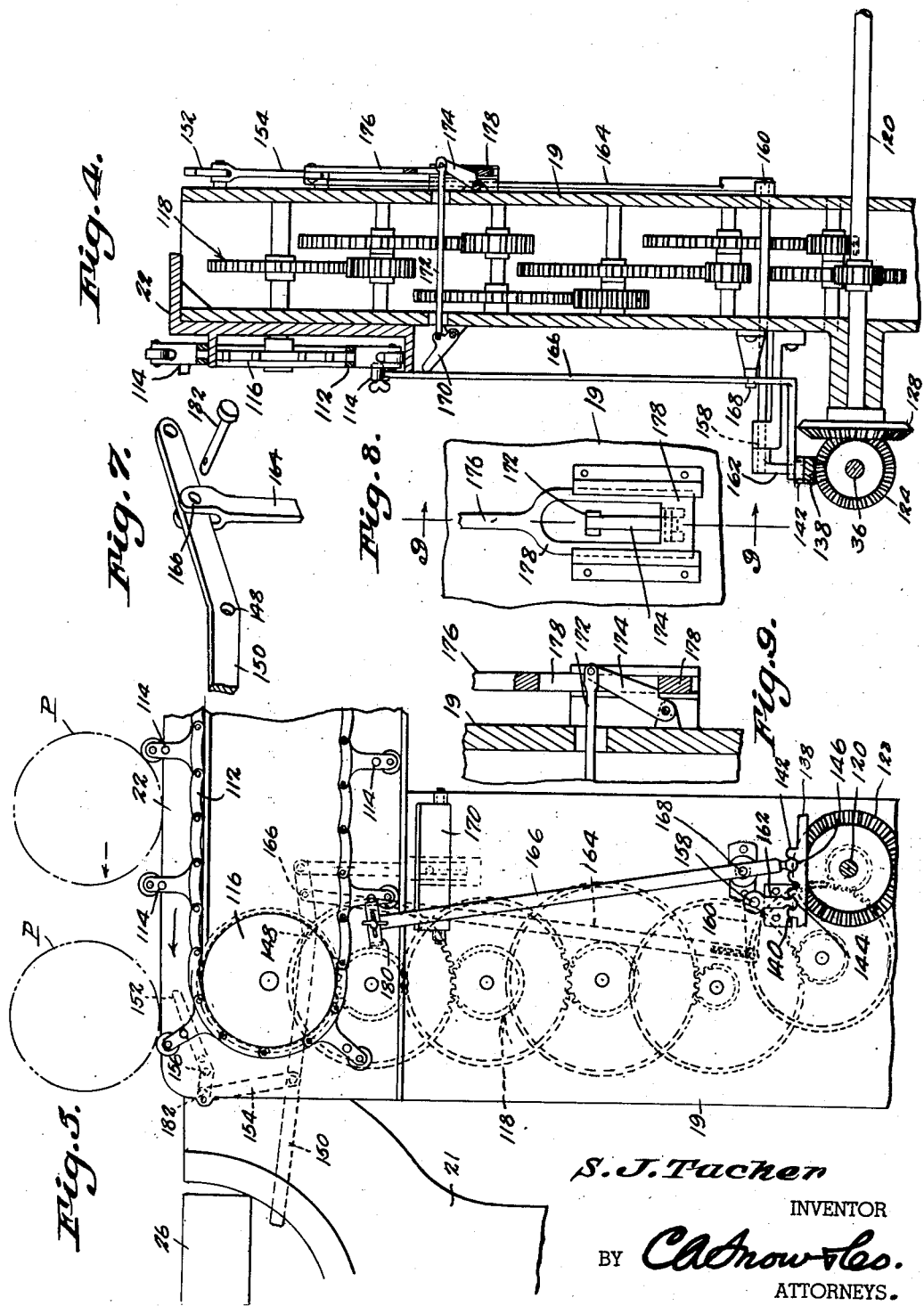
S. J. Tucker
INVENTOR
BY C. A. Snow & Co.
ATTORNEYS.

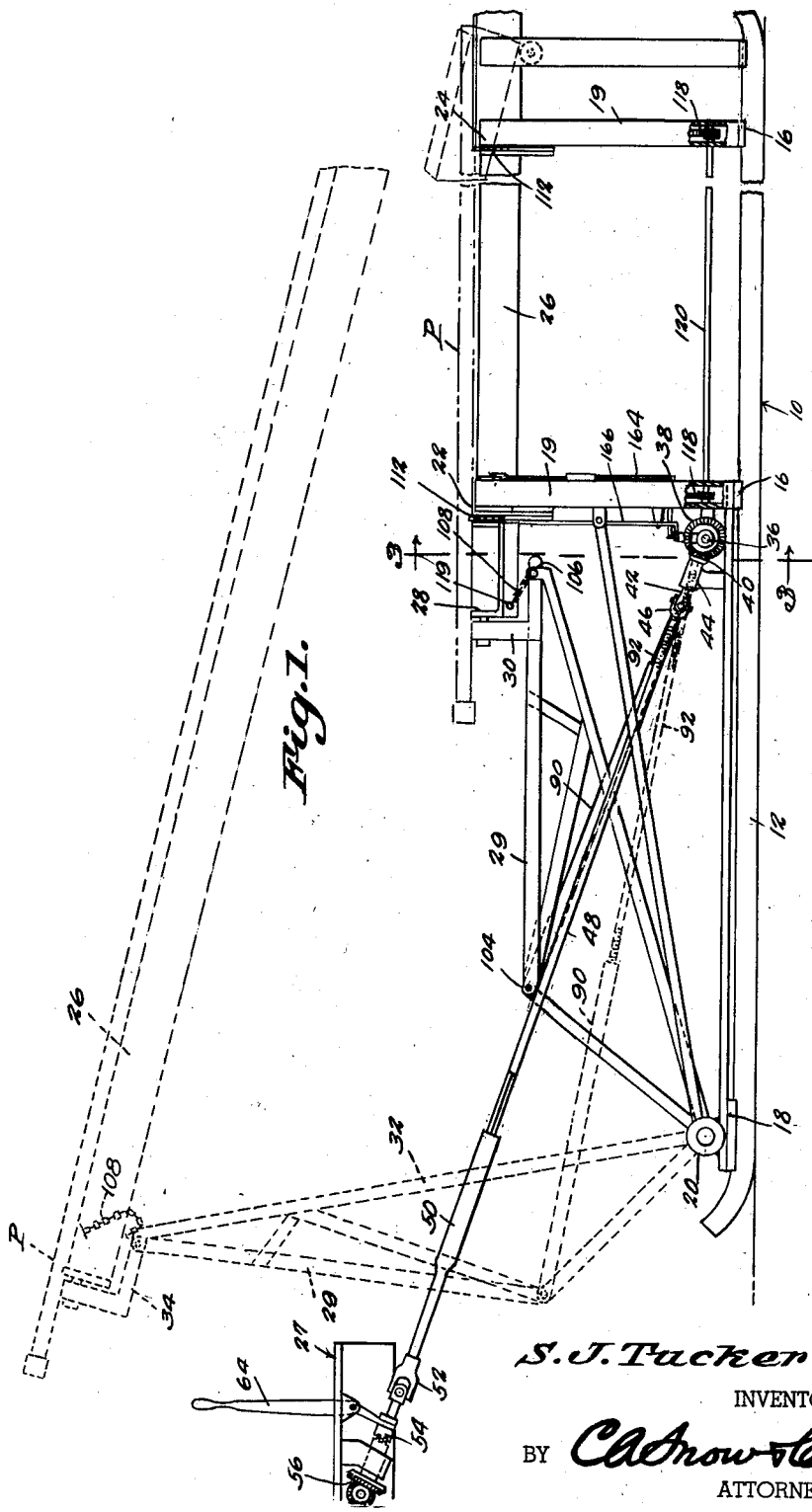

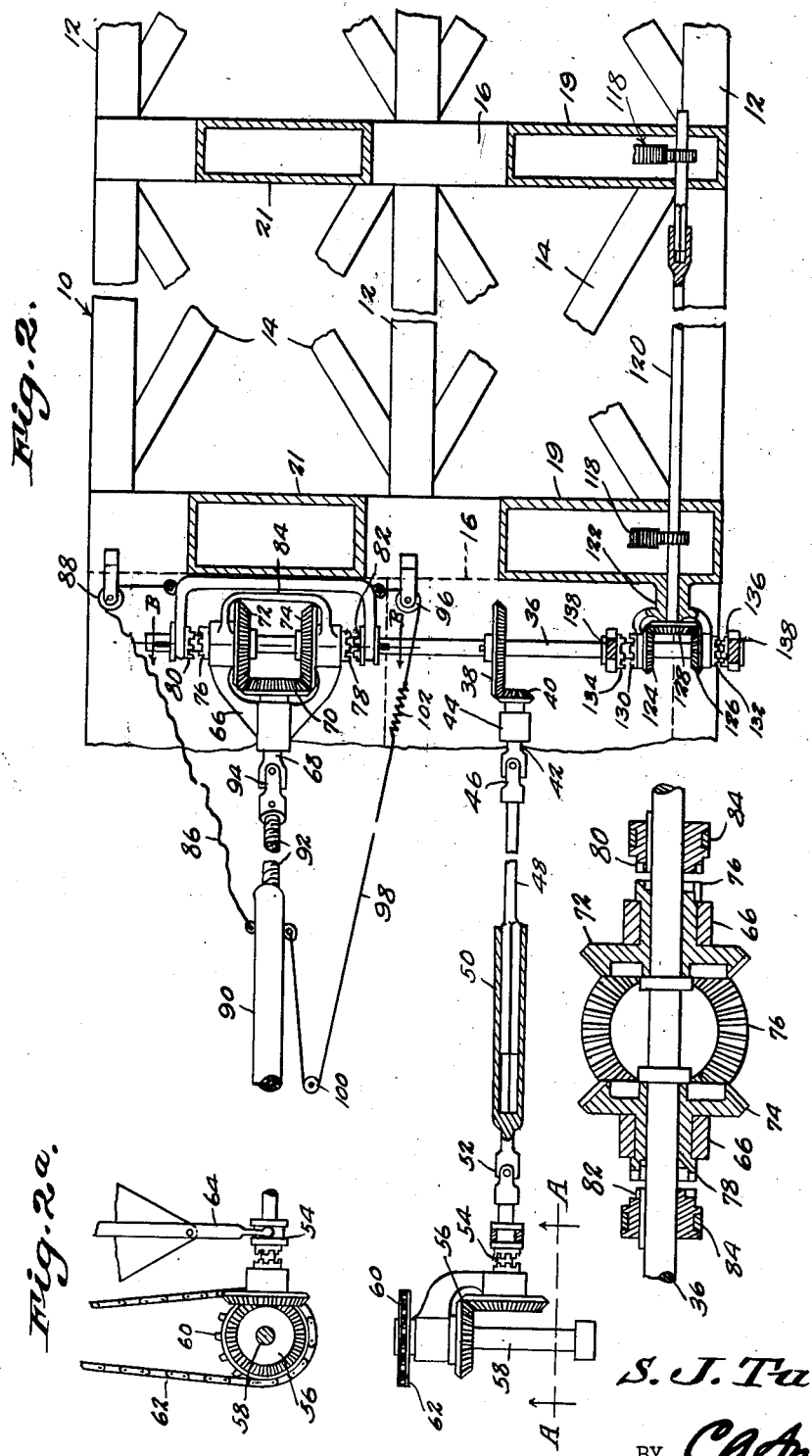

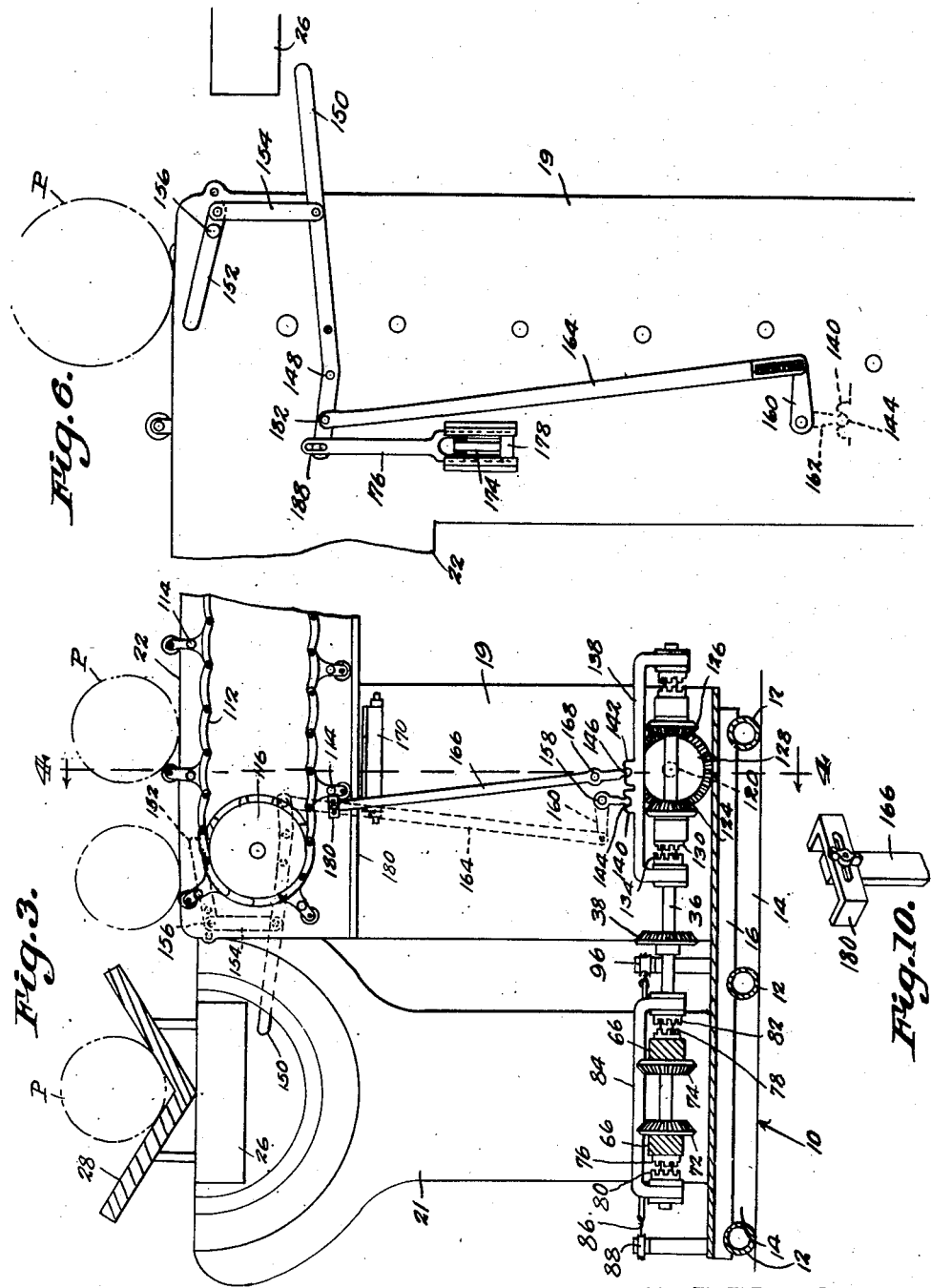

Patented Oct. 20, 1953

2,656,052

UNITED STATES PATENT OFFICE 2,656,052

APPARATUS FOR FEEDING LENGTHS OF
DRILL PIPE IN SUCCESSION TO THE
DRILL PIPE ELEVATOR OF DRILL RIGS

Samuel J. Tucker, Memphis, Tenn.

Application November 5, 1951, Serial No. 254,957

8 Claims. (Cl. 214—2.5)

This invention relates to apparatus for feeding lengths of tubular conduit in succession to the drill pipe elevator of a drill rig and is an improvement on the invention disclosed in my copending application Serial No. 171,007 now Patent No. 2,631,741.

The primary object of the invention is to transfer from a table supporting parallel lengths of tubular conduit successive lengths of tubular conduit to a carriage mounted adjacent the table preparatory to the delivery of the length of tubular conduit on the carriage to the drill pipe elevator of a drill rig.

Another object is to automatically reverse the carriage moving equipment when the carriage has been moved to its fullest extent both toward and away from the drill rig and thus to provide a continuously operating unit requiring but a minimum of attention by an operator.

A further object is to render the device useful not only for delivering conduit to the elevator of a drill rig, but also for removing conduit automatically from the elevator as the conduit is lowered by the elevator after its extraction from a well hole.

The above and other objects may be attained by employing this invention which embodies among its features an elongated transversely tiltable carriage mounted to move longitudinally from a horizontal position remote from the drill rig to an upwardly inclined position adjacent the drill rig, means mounted between the carriage and the drill rig and connected to the carriage adjacent one end thereof for so moving the carriage, means connected to the carriage moving means and to the carriage for tilting the carriage to conduit receiving position as it approaches the horizontal, a table mounted adjacent the carriage for supporting parallel lengths of tubular conduit in parallel relation to the carriage for transfer from the carriage when it is in conduit receiving position, and means carried by the table adjacent the carriage and operable by the tilting of the carriage for transferring a length of conduit from the table to the carriage.

Other features include an endless chain mounted on the table and operating in a closed path which lies perpendicular to the carriage for advancing tubular conduit along the table toward the carriage and means operable by the tilting of the carriage into conduit receiving position for controlling the movements of the endless chain, and arresting the movement thereof as a length of tubular conduit is being transferred from the table to the carriage.

In the drawings,

Fig. 1 is a side view in elevation of a drill pipe feeding device embodying the features of this invention, Fig. 2 is a top plan view of the device illustrated in Fig. 1, certain parts being broken away more clearly to illustrate certain details of construction, Fig. 2a is a fragmentary detail view taken substantially along the line A—A of Fig. 2, Fig. 2b is a fragmentary sectional view taken substantially along the line B—B of Fig. 2, Fig. 3 is a fragmentary enlarged detail view taken substantially along the line 3—3 of Fig. 1, Fig. 4 is a fragmentary enlarged sectional view taken substantially along the line 4—4 of Fig. 3, Fig. 5 is an enlarged detail view of the structure illustrated in Fig. 4 taken from the left side of the device when viewed in Fig. 4, Fig. 6 is a view similar to Fig. 5 taken from the opposite side of Fig. 4, Fig. 7 is an enlarged fragmentary perspective view of the pipe transfer control lever, Fig. 8 is an enlarged detail side view of the stop lever kick out mechanism, Fig. 9 is a vertical sectional view taken substantially along the line 9—9 of Fig. 8, and Fig. 10 is a fragmentary enlarged perspective view of the upper end of the stop lever.

Referring to the drawings in detail a bed frame designated generally 10 comprises longitudinally extending spaced parallel skids 12 connected by cross braces 14 and supporting on its upper side transversely extending cross bars 16. As illustrated in the drawings the cross bars 16 are located in spaced parallel relation adjacent one end of the bed frame 10 and carried by the bed frame adjacent its opposite end is a transversely extending cross bar 18 carrying adjacent one side of the bed frame an eye 20 the purpose of which will hereinafter appear. Carried by and extending upwardly from the cross bars 16 adjacent opposite sides of the bed frame 10 are pedestals 19 and 21 carrying at their upper ends horizontally extending bridge members 22 and 24 respectively which cooperate in forming a table upon which lengths of pipe P are supported in parallel relation.

Carried by and extending upwardly from the bed frame 10 adjacent the pedestals 19 are pedestals 21 in which are mounted for tilting movement about an axis which lies parallel to the pipe on the table an elongated carriage 26 carrying a substantially V-shaped pipe supporting trough 28 adjacent to one end thereof and a movable V-shaped carriage movable longitudinally of said carriage 26 and when the carriage is tilted about the longitudinal axis both V-shaped pipe receiving surfaces lie in positions adjacent the table to receive a length of pipe P.

Pivotally connected to the eye 20 for movement in a vertical arcuate path from a substantially horizontal position adjacent a pedestal 21 to a substantially vertical position adjacent a drill rig designated generally 27 is a boom 29, the end of which remote from the eye 20 carries a bracket arm 30 which is connected to the carriage 26 adjacent the end thereof which lies nearest to the drill rig 27.

It will thus be seen that by moving the boom about the axis of the eye 20, in the vertical arcuate path, the carriage 26 will be moved from a horizontal position adjacent the table to an upwardly inclined position with one end disposed adjacent the drill rig 27.

Mounted for rotation about a horizontal transversely extending axis on the bed frame 10 adjacent the pedestals 19 and 21 is a transversely extending jack shaft 36 carrying intermediate its ends a bevel gear 38 which has driving connection with a bevel pinion 40 mounted on a shaft 42 carried by a bearing 44 mounted on the bed frame 10. Coupled by a suitable universal joint 46 to the shaft 42 is a splined shaft 48 and mounted for longitudinal sliding movement on the splined shaft 48 is a splined sleeve 50 by means of which rotary motion is imparted to the shaft 48 through the medium of the splines. The sleeve 50 is coupled through the medium of a conventional universal joint 52 to a clutch 54 which is coupled through the medium of bevel gears 56 and a transversely extending shaft 58 to a drive sprocket 60 which has driving connection with a prime mover (not shown) carried by the drill rig 27 through the medium of a convention drive chain 62. A lever 64 is pivotally carried by the drill rig 27 and is operatively connected to the clutch 54 so that by shifting the lever about its pivot, power may be transmitted from the gearing 56 through the clutch 54 to the sleeve 50 for operating the pipe feeding apparatus.

Mounted on the jack shaft 36 beneath the boom 29 is a yoke 66 in which a stub shaft 68 is mounted this stub shaft carries adjacent the jack shaft 36 a drive pinion 70 which has meshing engagement with oppositely disposed drive gears 72 and 74 which are mounted for rotation on the jack shaft 36 and carry respectively clutch halves 76 and 78 which are adapted to be engaged respectively by clutch halves 80 and 82 which are carried by and splined to the jack shaft 36. A yoke 84 is connected to the clutch halves 80 and 82 for moving them longitudinally on the jack shaft 36 to alternately engage and disengage the clutch halves 76 and 78. A cable 86 is connected at one end to the yoke 84 and is trained over a pulley 88 adjacent one side of the bed frame 10. The opposite end of the cable 86 is connected at one end to an elongated internally screw threaded nut 90 which threadedly engages an elongated screw 92 which is coupled through the medium of a conventional universal joint 94 to the shaft 68. It will be seen that when the nut 90 is advanced along the screw 92 away from the yoke 66, the cable 86 will become taut until such time as pull is exerted on the yoke 84 to cause it to shift longitudinally of the shaft 36 and move the clutch halves 78 and 82 into meshing engagement. A pulley 96 is carried by the bed frame 10 on the side of the yoke 84 opposite the pulley 88, and trained over said pulley 96 is a cable 98 which is connected at one end to the yoke 84 on the side thereof opposite the connection of the cable 86 thereto, and this cable is trained over a pulley 100 carried by the bed frame beneath the boom and remote from the yoke 66 and is coupled to the nut 90 opposite the connection of the cable 86 to the nut 90 so that when the nut is retracted by rotation of the screw 92 pull will be exerted on the yoke 84 to move the clutch half 80 into meshing engagement with the clutch half 76. In the preferred form of the invention I employ a retractile coil spring 102 in the cable 98 to afford the engagement of the clutch halves 76 and 80 under yielding effort. The end of the nut 90 remote from that which is threadedly engaged by the threaded shaft 92 is connected at 104 to the boom 29 so that as the nut is advanced and retracted on the threaded shaft 92, the boom will be raised and lowered in the vertical arcuate path.

Connected as at 106 to the arm 30 carried by the boom 29 is one end of a flexible member 108 such as a chain and the opposite end 110 of said flexible member is connected to the carriage 26 so that when the carriage attains a horizontal position beside the table carrying the pipe lengths P the carriage will be moved about the longitudinal axis to tilt the trough 28 into pipe receiving position.

When the boom 29 is moved to a horizontal position the chain 108 serves to tilt the carriage 26 and the trough 28 so that the pipe sections P may be rolled onto the trough. As the boom is raised the trough 28 assumes the position shown in Fig. 3. The other free end of the boom requires no additional support as the trough 28 has only a slight tilting movement with respect to the boom to permit the pipe sections to be rolled into the trough and in the loading position. The chain is slack when the boom is in the uppermost position and serves to swing or tilt the trough to the loading position when the boom is moved to the full line position illustrated in Fig. 1. In Fig. 3 the parts are shown in the position in which they will appear just prior to the time when the chain 108 functions to tilt the trough to loading position. The pipe sections are supported on the carriage adjacent the opposite ends thereof, and the weight thereof moves the carriage to the position shown in Fig. 3 as the boom is lifted.

Mounted on the horizontal bars 22 forming the table upon which the pipe lengths P are supported are endless chains 112 which move in closed paths which lie perpendicular to the carriage 26 and carry longitudinally spaced outwardly extending pipe engaging fingers 114 which extend between the parallel lengths of the pipe P and serve to advance the pipe along the table toward the carriage 26. The chains 112 are trained over drive sprockets 116 carried by the pedestals 19 which are coupled through a gear train designated generally 118 to a drive shaft 120 which is mounted for rotation adjacent the lower ends of the pedestals 19 about an axis which lies perpendicular to and intersects the axis of the jack shaft 36. Carried by the pedestal 19 adjacent the carriage 26 and surrounding the shaft 120 is a yoke 122 in which are mounted for rotation about the axis of the jack shaft 36 bevel drive gears 124 and 126 which have meshing engagement with a bevel drive gear 128 carried by the shaft 120.

And carried by the gear 124 on the exterior of the yoke is a clutch half 130 while a similar clutch half 132 is carried by the gear 126. Mounted for longitudinal sliding movement on the jack shaft 36 adjacent the clutch half 130 is a clutch half 134 which is driven by the shaft 36 and a similar clutch half 136 is mounted on the shaft 36 adjacent the clutch half 132, it being understood that the clutch half 136 while moving longitudinally of the jack shaft 36 rotates with said jack shaft. A yoke 138 is carried by the clutch halves 134 and 136 and moves longitudinally of the jack shaft 36 to selectively move the clutch half 134 into engagement with the clutch half 130 or the clutch half 136 into engagement with the clutch half 132. The yoke 138 is of such length that it may be moved to a neutral position in which the clutch halves 134, 130, 132 and 136 are entirely out of engagement, and carried by the yoke and projecting outwardly therefrom are lugs 140 and 142 respectively having notches 144 and 146 opening through their outer sides.

Pivotally connected as at 148 to a pedestal 19 is an operating lever 150 which projects into the path of movement of the carriage 26 and when the latter is tilted by the flexible member 108, the lever is moved about its pivot. Pivotally mounted on the pedestal 19 above the lever 150 is a finger 152 which normally projects toward the table along which the pipe lengths P are advanced, and connected to the transfer finger 152 is a link 154 which is coupled to the lever 150, so that when it is depressed by the rocking movement of the carriage 26, the finger will be moved about its pivot 156 to swing in a vertical arc and engage the pipe length P lying adjacent the carriage 26 to transfer the pipe to the trough 28.

Pivotally mounted as at 158 adjacent the lower end of the pedestal 19 on which the lever 150 is mounted is a bell crank arm 160, one arm 162 of which projects downwardly and engages in the notch 144 of the yoke 138. The opposite arm of the bell crank lever 160 lies substantially perpendicular to the arm 162 on the side of the pedestal 19 opposite the yoke 138, and pivotally connected to the horizontally extending arm of the bell crank lever 160 is the lower end of a link 164 which is pivotally coupled at its upper end as at 166 to the lever 150 so that as the opposite end of the lever is depressed by engagement of the carriage 26 therewith, the link 164 will be moved upwardly to cause the bell crank 160 to rock and move the yoke 138 to the left as viewed in Fig. 5 and thereby cause the clutch half 136 to engage the clutch half 132 and thereby impart rotary motion to the shaft 120 to cause the chains to move in the direction of the arrows in Fig. 5 to advance the parallel lengths of pipe P resting on the table toward the carriage. A lever 166 is pivoted adjacent its lower end at 168 to the pedestal 19 on the side thereof remote from the link 164 and the lower end of the lever 166 is received in the notch 146 formed in the lug 142 carried by the yoke 138. The upper end of the lever extends into the path of movement of the lugs 114 carried by the chains 112 so that as a lug moves in its closed path away from the carriage 26, the lever 166 will be engaged to cause it to rock about its pivot 168 and move the yoke 138 in a direction to move the clutch halves 132 and 136 out of engagement to thereby arrest further motion of the chains 112.

Pivotally mounted on the pedestal 19 on the side thereof adjacent the lever 166 for movement into and out of the path of movement of said lever is an elongated plate 170 to which is coupled a link 172 which extends transversely through the pedestal 19 and is connected on the side of the pedestal 19 remote from the link 164 a rock arm 174 which when the plate 170 is out of the path of movement of the lever 166 extends upwardly and outwardly with relation to the adjacent side of the pedestal 19 as will be readily understood upon reference to Fig. 4. Pivotally suspended from the lever 150 adjacent the end thereof remote from the carriage 26 is a yoke 176 having a loop 178 which surrounds the finger 174 so that as the lever 150 is moved by engagement by the carriage 26, the yoke 176 will be moved upwardly and into engagement with the outer surface of the finger 174 to thereby cause it to rock about its pivotal connection to the pedestal 19 and move the plate 170 outwardly and against the lever 166 to cause the upper end of the lever to move out of the path of movement of the lugs 114 on the chain 112 and thereby render the lever 166 inoperative as a stop mechanism during the advance of the pipe along the tab 1e toward the carriage 26. In the preferred form of the invention, the upper end of the lever 166 which lies in the path of movement of the lugs 114 is provided with an adjustable shoe 180 by means of which the exact point of contact between a lug 114 and the lever may be regulated.

By employing loose pins 182 for connecting the link 154 to the finger 152 and connecting the link 164 to the lever 150, it is obvious that the link 164 may be coupled to the lever 150 on one or the other side of the pivot point 148 of the lever 150 so as to adapt the apparatus for use in either feeding pipe to the elevator of a drill rig, or receiving pipe and transferring it from the elevator of the drill rig to an adjacent table. In this way the device may be used not only as a feeder, but as a means for automatically receiving and storing well pipe which is being extracted from a well hole.

In use assuming that the device is being used for feeding pipe, the chain 62 is coupled to the prime mover (not shown) of the drill rig so as to impart rotary motion to the shaft 58 which is transmitted through the gears 56 to the sleeve 50. By reason of the splined connection between the sleeve 50 and shaft 48, it is evident that the locating of the feeding device relative to the drill rig is not critical and may vary within moderate limits. The power transmitted to the shaft 48 is transmitted through the gears 40 and 38 to the jack shaft 36 which is continuously driven so long as the hand lever 64 is in a position to keep the clutch 54 engaged. One or the other of the clutch members 76 or 78 is constantly in mesh with its adjacent clutch half so that when the shaft 36 is driven, the drive pinion 70 of the screw 92 will be rotated in one or the other direction. Assuming that the clutch halves 76 and 80 are in engagement, it will be evident that the screw 92 turning in a clockwise direction will cause the nut 90 to travel longitudinally thereon away from the shaft 36. Such longitudinal movement of the nut 90 will cause the boom 29 to move in its arcuate path about the axis of the eye 20 into a substantially vertical position as illustrated in the dotted lines in Fig. 1. Upon reaching the upper limit of its movement, the nut 90 exerts pull on the cable 86 and moves the yoke 84 to disengage the clutch halves 76 and 80 and move the clutch halves 78 and 82 into engagement so as to reverse the direction of rotation of the screw 92 and cause the boom to move to lowered position through its vertical arcuate path. Upon approaching the lowered position, of the boom, the nut 90 exerts pull on the cable 98 which in turn through the medium of the yielding means 102 exerts yielding pull on the yoke 84 to again engage the clutch halves 76 and 80 and reverse the direction of rotation of the screw 92. In this way while the clutch 54 is engaged, the boom is continuously moved through its vertical arcuate path from a substantially horizontal position remote from the drill rig 27 to a substantially vertical position adjacent the drill rig 27. With the boom 29 connected to the carriage 26, it will be evident that the carriage will move in unison with the boom from a horizontal position adjacent the side of the table upon which the pipe lengths P are supported, to an upwardly inclined position adjacent the drill rig substantially as shown in dotted lines in Fig. 1. As the carriage moves to its lowered horizontal position, the chain 108 is drawn taut so as to exert pull on the side of the carriage to which the chain is coupled and cause the carriage to rock about a longitudinal axis and cause the trough 28 to move into a pipe receiving position. As the carriage rocks and so moves the trough, the carriage engages the projecting end of the lever 150 causing it to rock about its pivot 143 and exert downward pull on the link 154 to throw the transfer finger 152 upwardly about its pivot 156 and into engagement with a pipe length lying adjacent the carriage to thereby propel the pipe length into the trough 28. Simultaneously with the downward movement of the link 154, the link 164 is moved downwardly to rock the bell crank 160 about its pivot point 158 and cause the arm 162 of the bell crank to shift the yoke 138 and thereby move the clutch half 134 into meshing engagement with the clutch half 130 to impart rotary motion to the shaft 120 which in turn through the medium of the gear train 118 causes the sprocket 116 to move the chain in its closed path in the direction of the arrow in Fig. 5 and thereby advance the lengths of pipe P carried by the table toward the carriage 26. As the fingers 114 approach the end of the table adjacent the carriage, one of the fingers 114 on the lower run of the chain 112 engages the shoe 180 on the lever 166 to cause said lever to move about its pivot and through its engagement in the notch 146 of the lug 142 carried by the yoke 138 to move the yoke 138 in a direction to disengage the clutch half 134 from the clutch half 130 to thereby discontinue the transmission of power to the chains 112. Simultaneously with the downward movement of the end of the lever 150 adjacent the carriage 26, the opposite end of the lever moves upwardly and through the medium of the pin and slot connection 188 by means of which the link 176 is coupled to the lever 150, the yoke 78 is moved upwardly to engage the side of the finger 174 and exert pressure on the link 172 to rock the shoe 170 about its horizontal pivot and into contact with the lever 166 to move said lever outwardly away from the pedestal 19 and out of the path of movement of the lugs 114 on the chains 112. In this way pipe lengths lying in parallel relation on the table are transferred in succession from the table to the carriage and delivered by the carriage to an adjacent drill rig in a position to be readily coupled to the elevator thereof. Moreover the operation is entirely automatic with the exception of the control lever 64 which may be mounted at a convenient place on the drill rig so that a large number of pipe lengths may be handled with but a minimum of labor. Obviously by simply changing the position of the lever 64 from the left hand connection to the lever 166 to the right hand connection thereto when viewed in Fig. 6, it will be evident that the device may be used in a reverse operation for automatically receiving pipe from the elevating apparatus of a drill rig and depositing it in parallel lengths on the table. In the reverse operation, the yoke 138 moves in a direction to engage and disengage the clutch half 136 with the clutch half 132 while the clutch halves 130 and 134 remain idle.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. Apparatus for feeding lengths of tubular conduit in succession to the elevating apparatus of a drill rig comprising an elongated transversely tiltable carriage mounted to move longitudinally from a horizontal position remote from a drill rig to an upwardly inclined position adjacent the drill rig means mounted between the carriage and the drill rig and connected to the carriage adjacent one end thereof for so moving the carriage, means connected to the carriage moving means and to the carriage for tilting said carriage to conduit receiving position as it approaches the horizontal, a table mounted adjacent the carriage for supporting parallel lengths of tubular conduit in parallel relation to the carriage for transfer to the carriage when it is in its conduit receiving position, and a finger pivoted to the table adjacent the carriage and operable by the tilting of the carriage for engaging a length of tubular conduit and transferring it from the table to the carriage.

2. Apparatus for feeding lengths of tubular conduit in succession to the elevating apparatus of a drill rig comprising an elongated transversely tiltable carriage mounted to move longitudinally from a horizontal position remote from a drill rig to an upwardly inclined position adjacent the drill rig, means mounted between the carriage and the drill rig and connected to the carriage adjacent one end thereof for so moving the carriage, means connected to the carriage moving means and to the carriage for tilting said carriage to conduit receiving position as it approaches the horizontal, a table mounted adjacent the carriage for supporting parallel lengths of tubular conduit in parallel relation to the carriage for transfer to the carriage when it is in its conduit receiving position, a lever pivoted to the table and extending into the path of movement of the carriage for engagement thereby as said carriage tilts to conduit receiving position, and means carried by the table adjacent the carriage and operable by the lever for transferring a length of tubular conduit from the table to the carriage.

3. Apparatus for feeding lengths of drill pipe in succession to the drill pipe elevating apparatus of a drill rig comprising an elongated transversely tiltable carriage mounted to move longitudinally from a horizontal position remote from a drill rig to an upwardly inclined position adjacent the drill rig, means mounted between the carriage and the drill rig and connected to the carriage adjacent one end thereof for so moving the carriage, means connected to the carriage moving means and to the carriage for tilting said carriage to pipe receiving position as it approaches the horizontal, a table mounted adjacent the carriage for supporting parallel lengths of drill pipe in parallel relation to the carriage for transfer to the carriage when it is in its drill pipe receiving position, a lever pivoted to the table and extending into the path of movement of the carriage for engagement thereby as said carriage tilts to pipe receiving position, and a finger pivoted to the table adjacent the carriage and connected to the lever for operation thereby to engage a length of drill pipe and transfer it from the table to the carriage.

4. In apparatus for feeding a length of drill pipe to the drill pipe elevating apparatus of a drill rig, said feeding apparatus being of the type comprising a boom mounted adjacent a drill rig to move in a vertical arcuate path, and an elongated pipe carriage connected to the boom and mounted for longitudinal bodily movement from a horizontal pipe receiving position remote from the drill rig to an upwardly inclined pipe delivering position adjacent the drill rig, means for moving the boom in the arcuate path to move the carriage to unloading position comprising elongated extensible and contractable means mounted adjacent one end adjacent the carriage and connected adjacent its opposite end to the boom, means mounted adjacent the carriage and connected to the extensible and contractable means for extending and contracting said means, and means connected to the extending and contracting means and to the extensible and contractable means for reversing the direction of movement of the extensible and contractable means for returning the carriage to loading position when the boom attains predetermined positions in its arcuate path.

5. In apparatus for feeding a length of drill pipe to the drill pipe elevating apparatus of a drill rig said feeding apparatus being of the type comprising a boom mounted adjacent a drill rig for movement in a vertical arcuate path, and an elongated pipe carriage connected to the boom for movement longitudinally from a horizontal position remote from the drill rig to an upwardly inclined position adjacent the drill rig, means for moving said boom in the arcuate path to unloading position comprising an elongated screw mounted adjacent the carriage to rotate about its longitudinal axis, an elongated nut threadedly engaging the screw and connected adjacent one end to the boom, a reversible clutch mounted adjacent the carriage and connected to the screw for rotating said screw and advancing or retracting the nut, and means connected to the nut and to the clutch for shifting said clutch and reversing the direction of rotation of the screw for returning the carriage to loading position when the nut moves to predetermined positions on the screw.

6. In apparatus for feeding a length of drill pipe to the drill pipe elevating apparatus of a drill rig said feeding apparatus being of the type comprising a boom mounted adjacent a drill rig for movement in a vertical arcuate path, and an elongated pipe carriage connected to the boom for movement longitudinally from a horizontal position remote from the drill rig to an upwardly inclined position adjacent the drill rig, means for moving said boom in the arcuate path to unloading position comprising an elongated screw mounted adjacent the carriage to rotate about its longitudinal axis, an elongated nut threadedly engaging the screw and connected adjacent one end to the boom, a reversible clutch mounted adjacent the carriage and connected to the screw for rotating said screw and advancing or retracting the nut, flexible cables connected to the clutch and to the nut for shifting the clutch and reversing the direction of rotation of the screw for returning the carriage to loading position when the nut moves to predetermined positions on the screw, and an extensible spring connected to one of the cables between the nut and the clutch for cushioning the movement of the clutch.

7. Apparatus for feeding lengths of drill pipe in succession to the drill pipe elevating apparatus of a drill rig comprising an elongated transversely tiltable carriage mounted to move longitudinally from a horizontal position remote from a drill rig to an upwardly inclined position adjacent the drill rig, means mounted between the carriage and the drill rig and connected to the carriage adjacent one end thereof for so moving the carriage, means including a chain connected to the carriage moving means and to the carriage for tilting said carriage to pipe receiving position as it approaches the horizontal, a table mounted adjacent the carriage for supporting parallel lengths of drill pipe in parallel relation to the carriage for transfer to the carriage when it is in its drill pipe receiving position, an endless chain carried by the table and moving in a closed path which lies perpendicular to the carriage for advancing the parallel lengths of drill pipe toward the carriage, means carried by the table and connected to the chain for moving said chain in the closed path, means carried by the table and connected to the chain moving means and operable upon the tilting of the carriage for energizing the chain moving means when the carriage is in drill pipe receiving position, drill pipe engaging and separating lugs carried by the chain for movement therewith in a closed path, and means connected to the chain moving means and extending into the path of movement of the lugs, and said last named means being operable upon engagement by a lug for de-energizing the chain moving means.

8. Apparatus for feeding lengths of drill pipe in succession to the drill pipe elevating apparatus of a drill rig comprising an elongated transversely tiltable carriage mounted to move longitudinally from a horizontal position remote from a drill rig to an upwardly inclined position adjacent the drill rig, means mounted between the carriage and the drill rig and connected to the carriage adjacent one end thereof for so moving the carriage, means including a chain connected to the carriage moving means and to the carriage for tilting said carriage to pipe receiving position as it approaches the horizontal, a table mounted adjacent the carriage for supporting parallel lengths of drill pipe in parallel relation to the carriage for transfer to the carriage when it is in its drill pipe receiving position, an endless chain carried by the table and moving in a closed path which lies perpendicular to the carriage for advancing the parallel lengths of drill pipe toward the carriage, means carried by the table and connected to the chain for moving said chain in the closed path, means carried by the table and connected to the chain moving means and operable upon the tilting of the carriage for energizing the chain moving means when the carriage is in drill pipe receiving position, drill pipe engaging and separating lugs carried by the chain for movement therewith in a closed path, means connected to the chain moving means and extending into the path of movement of the lugs, said last named means being operable upon engagement by a lug for de-energizing the chain moving means, and means carried by the table and connected to the means operable upon the tilting of the carriage for moving the means that extends into the path of movement of the lugs out of such path while the carriage is in pipe receiving position.

SAMUEL J. TUCKER.

References Cited in the file of this patent

UNITED STATES PATENTS

| Number | Name | Date |
| --- | --- | --- |
| 1,263,341 | Slingluff et al. | Apr. 16, 1918 |
| 2,396,614 | Somes | Mar. 12, 1946 |
| 2,582,329 | Harter, Jr. et al. | Jan. 15, 1952 |